(12) United States Patent
Dageville et al.

(10) Patent No.: US 7,409,517 B2
(45) Date of Patent: Aug. 5, 2008

(54) DYNAMIC AND AUTOMATIC MEMORY MANAGEMENT

(75) Inventors: Benoit Dageville, Redwood Shores, CA (US); Mohamed Zait, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 335 days.

(21) Appl. No.: 09/969,290

(22) Filed: Oct. 1, 2001

(65) Prior Publication Data

US 2004/0073763 A1    Apr. 15, 2004

(51) Int. Cl.
G06F 12/02    (2006.01)

(52) U.S. Cl. .................................... 711/170

(58) Field of Classification Search ................. 711/170, 711/171, 173; 707/205
See application file for complete search history.

(56) References Cited

U.S. PATENT DOCUMENTS

| | | | |
|---|---|---|---|
| 5,274,805 A | 12/1993 | Ferguson et al. | |
| 5,561,786 A * | 10/1996 | Morse | 711/170 |
| 5,594,889 A | 1/1997 | Colgate et al. | |
| 5,765,157 A | 6/1998 | Lindholm et al. | |
| 5,784,699 A | 7/1998 | McMahon et al. | 711/171 |
| 5,787,300 A | 7/1998 | Wijaya | 712/1 |
| 5,799,210 A | 8/1998 | Cohen et al. | 710/56 |
| 5,826,082 A * | 10/1998 | Bishop et al. | 718/104 |
| 5,832,475 A | 11/1998 | Agrawal et al. | |
| 5,835,958 A | 11/1998 | Long et al. | |
| 5,860,144 A | 1/1999 | Frank et al. | 711/206 |
| 5,987,580 A | 11/1999 | Jasuja et al. | 711/170 |
| 6,192,460 B1 | 2/2001 | Goleman et al. | |
| 6,272,486 B1 | 8/2001 | Garth et al. | |
| 6,502,176 B1 | 12/2002 | Kobayashi et al. | |
| 6,625,709 B2 * | 9/2003 | Aiken et al. | 711/170 |
| 6,757,802 B2 | 6/2004 | Trainin et al. | |
| 2003/0056076 A1 * | 3/2003 | Cook et al. | 711/173 |
| 2004/0141650 A1 | 7/2004 | Hannson et al. | |

FOREIGN PATENT DOCUMENTS

| | | |
|---|---|---|
| CN | 02819443.8 | 1/2006 |
| CN | 02819443.8 | 7/2006 |

(Continued)

OTHER PUBLICATIONS

W. Zhang et al., "Dynamic Memory Adjustment for External Mergesort", Proceedings of the 23$^{rd}$ VLDB Conference Athens, Greece 1997, pp. 1-10.

(Continued)

*Primary Examiner*—Hiep T. Nguyen
(74) *Attorney, Agent, or Firm*—Silicon Valley Patent Group LLP; Omkar Suryadevara

(57) ABSTRACT

An application program (such as a database) is responsive to a value (also called externally-set global value) that defines the amount of memory to be used by the application program for functions (such as queries) performed by the application program. In one embodiment, a sequence of instructions (also called "memory broker") uses the externally-set global value to compute one or more internal values that are then used when allocating memory. The memory broker dynamically revises the internal value(s) based on memory being allocated for the functions, thereby to form a feedback loop.

93 Claims, 5 Drawing Sheets

FOREIGN PATENT DOCUMENTS

| EP | PCT/US02/31223 | 9/2002 |
|---|---|---|
| EP | WO 2003/029982 A3 | 4/2003 |
| EP | 02 800 401.81243 | 3/2005 |
| EP | 02 800 401.81243 | 9/2005 |
| EP | 02 800 401.81243 | 2/2006 |
| EP | 02 800 401.81243 | 6/2006 |

OTHER PUBLICATIONS

H. Zeller et al., "Hash Join Algorithms in a Multiuser Environment", Technical Report 90.4, Feb. 1990, Part No. 40048, pp. 1-18.

Oracle8i Reference Release 2 (8.1.6), Part No. A76961-01, 1999, pp. 1-5.

Oracle8i Concepts Release 2 (8.1.6), Part No. A76965-01, 1999, pp. 1-12.

Oracle8i Utility Release 2 (8.1.6), Part No. A76955-01, 1999, pp. 1-25.

Oracle8i Tuning Release (8.1.5), Part No. A67775-01, 1999, pp. 1-25.

Oracle Technical Report, "Hash Joins Implementation and Tuning" Release 7.3, ACTA Mar. 1997, pp. 1-20.

K. L. Beck, "Memory Allocation in Adaptive External Sorting", Oct. 1993, pp. i-ix and 1-64.

H. Zeller et al., "An Adaptive Hash Join Algorithm for Multi-user Environments", VLDB 1990, pp. 186-197.

IBM Technical Disclosure Bulletin, IBM Corp. New York, US, vol. 36 No. 12 Dec. 1993, Dynamic Memory Allocation for Multiple Concurrent Sorts, pp. 369-370.

"Microsoft SQL Server 7.0 Storage Engine Capacity Planning Tips", http://msdn.microsoft.com/library/en-us/dnsql7/html/storageeeng.asp, pp. 1-24.

N. Kabra, et al., "Efficient Mid-Query Re-Optimization of Sub-Optimal Query Execution Plans", 1998 ACM SIGMOND International Conference on Management of Data, vol. 27, No. 2, Jun. 1998 pp. 106-117.

M. Mehta et al., "Dynamic Memory Allocation for Multiple-Query Workloads", Proceedings of 19th International Conference on Very Large Data Bases, Aug. 1993, pp. 354-367.

L. Bouganim et al, "Memory-Adaptive Scheduling for Large Query Execution", Proceedings of Conference on Information and Knowledge Management, 1998 published by Association for Computing Machinery, Inc., pp. 105-115.

D. L. Davison et al., "Dynamic Resource Brokering for Multi-User Query Execution", published in SIGMOD 1995, pp. 281-292.

L. Bouganim et al., Dynamic Memory Allocation for Large Query Execution, published in Networking and Information Systems, 1(6), pp. 629-652 (1998).

H. Zeller et al., "An Adaptive Hash Join Algorithm for Multiuser Environments", Proceedings of the 16th VLDB Conference, Brisbane, Australia, 1990, pp. 186-197.

H. Pang et al., "Memory-Adaptive External Sorting", Proceedings of the 19th International Conference on Very Large Data Bases, Aug. 1993, Computer Sciences Department University of Wisconsin-Madison, pp. 1-35.

Office Action dated Aug. 12, 2004 in U.S. Appl. No. 09/969,334.
Amendment dated Nov. 12, 2004 in U.S. Appl. No. 09/969,334.
Office Action dated Jun. 15, 2005 in U.S. Appl. No. 09/969,334.
Amendment dated Oct. 17, 2005 in U.S. Appl. No. 09/969,334.
Office Action dated Jan. 12, 2006 in U.S. Appl. No. 09/969,334.
Amendment dated Mar. 13, 2006 in U.S. Appl. No. 09/969,334.
Advisory Action before the filing of an Appeal Brief dated Mar. 31, 2006 in U.S. Appl. No. 09/969,334.
Pre-appeal brief request for review dated Apr. 12, 2006 in U.S. Appl. No. 09/969,334.
Notice of Panel Decision from Pre-Appeal Brief Review dated May 9, 2006 U.S. Appl. No. 09/969,334.
Appeal Brief dated Jun. 12, 2006 in U.S. Appl. No. 09/969,334.
Examiner's Answer dated Jul. 26, 2006 in U.S. Appl. 09/969,334.
Reply Brief dated Sep. 26, 2006 in U.S. Appl. No. 09/969,334.
Decision on Appeal dated May 25, 2007 in U.S. Appl. No. 09/969,334.
Notice of Allowance dated Sep. 20, 2007 in U.S. Appl. No. 09/969,334.
Amendment dated Oct. 31, 2007 in U.S. Appl. No. 09/969,334.
European Notice of Allowance dated Dec. 29, 2006 in Application EP 02 800 401.8—1243.
Indian Office Action dated Apr. 30, 2007 in Application No. 412/KOLNP/2004.
Notice of Allowance dated Jan. 2, 2008 in U.S. Appl. No. 09/969,334.

* cited by examiner

DYNAMIC AND AUTOMATIC MEMORY MANAGEMENT

CROSS-REFERENCE TO RELATED APPLICATION

This application is related to the commonly owned, concurrently filed and copending U.S. patent application entitled "Adaptive Memory Allocation" application Ser. No. 09/969,334 that is incorporated by reference herein in its entirety.

BACKGROUND

In typical database systems, users store, update and retrieve information by submitting commands to a database application, such as Oracle. When executing transactions, the database application stores information in memory and on disk. For best performance, as much information as possible must be stored in memory rather than on disk. However, as memory resources are limited, the database application must tune memory allocation, which involves distributing available memory to structures used by the database application.

As described in a book entitled "Oracle8i Concepts" available from Oracle Corporation, and on the Internet at an address obtained by replacing "#" with "." and "$" with "/" in the following string "$$oradoc#photo#net$ora81$DOC$server#815$a67781$toc#htm" (which book is incorporated by reference herein in its entirety), two of the structures used by the database application Oracle are memory areas called System Global Area (SGA) and Program Global Area (PGA). The SGA contains general information about the state of the database and the instance, which the Oracle processes need to access. No user data is stored in the SGA. The size of the SGA is determined at start up of Oracle. For optimal performance in most systems, the entire SGA should fit in real memory. A database administrator (DBA) can see how much memory is allocated to the SGA and each of its internal structures by issuing the SQL statement "SHOW SGA."

A PGA is created for holding data and control information of each process, when the process is started. The PGA is private to each process in Oracle, although such PGA can be in shared memory. A PGA's initial size is fixed at startup of the corresponding process, and is operating-system specific. Currently, in Oracle8i, the DBA can control the PGA memory utilization, using various parameters like SORT_AREA_SIZE, HASH_AREA_SIZE, BITMAP_MERGE_AREA_SIZE and CREATE_BITMAP_AREA_SIZE. For more information on such parameters, see the book entitled "Oracle8i Tuning" available at an address obtained by replacing "#" with "." and "$" with "/" in the following string $$oradoc#photo#net$ora81$DOC$server#815$a67775$toc#htm (which book is incorporated by reference herein in its entirety).

See also U.S. Pat. No. 5,799,210 granted to Cohen, et al. entitled "Method for allocating either private or shared buffer memory for storing data from sort operations in accordance with an assigned value or threshold value", U.S. Pat. No. 5,987,580 Jasuja, et al. entitled "Serially reusable execution memory", U.S. Pat. No. 5,860,144 Frank, et al entitled "Addressing method and system for providing access of a very large size physical memory buffer to a number of processes", and U.S. Pat. No. 5,784,699 McMahon, et al. "Dynamic memory allocation in a computer using a bit map index" all of which are related to the use of memory by database processes.

For additional information, see the paper by Luc Bouganim, Olga Kapitskaia, and Patrick Valduriez, entitled "Dynamic Memory Allocation for Large Query Execution" published in Networking and Information Systems 1(6): 629-652 (1998). See also the paper entitled, "Memory-Adaptive Scheduling for Large Query Execution" by these same three authors, pages 105-115 of Proceedings of Conference on Information and Knowledge Management, 1998 published by Association for Computing Machinery, Inc. Yet another paper in this field is by Diane L. Davison and Goetz Graefe, entitled "Dynamic Resource Brokering for Multi-User Query Execution", published in SIGMOD Conference 1995: 281-292.

SUMMARY

A computer programmed in accordance with the invention is responsive to a value that defines the total amount of memory to be used by an application, such as a database. In one example, a database administrator (DBA) provides such a value (also called "externally-set global value"). In another example, the externally-set global value is automatically determined, e.g. based on the amount of memory that is currently available in the system. Thereafter, the computer allocates memory (e.g. to be used by a database query) in an amount derived (wholly or at least in part) from the externally-set global value.

One embodiment of the programmed computer derives, from the externally-set global value an internal value (called "memory bound") that is used in allocating memory for the application (e.g. memory required by an operator that implements a database query). The memory bound can be derived in any manner apparent to the skilled artisan, for example depending on processes and structures that implement the database.

In one embodiment, the programmed computer dynamically revises the memory bound, based on memory allocations being done, thereby to form a feedback loop. Optionally, in determining the memory bound, the programmed computer may be responsive to information outside the application (such as the amount of memory allocated by non-database processes), so that the limited memory in the computer is used effectively.

DETAILED DESCRIPTION

Figure 1A:
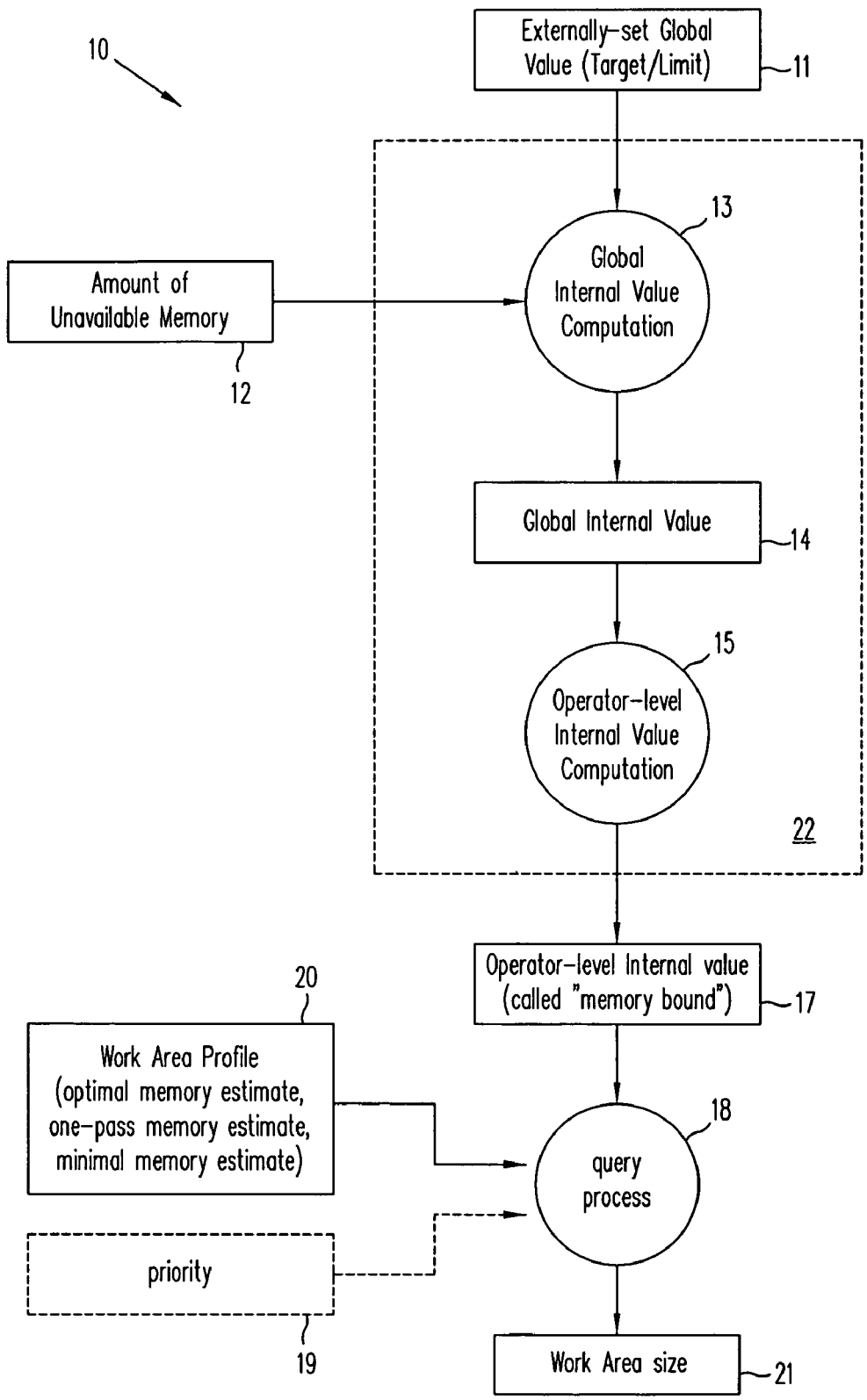
FIG. 1A illustrates, in a dataflow diagram, data and logic in a computer programmed in accordance with the invention.

When programmed with software in accordance with the invention, a computer is responsive to a value 11 (FIG. 1A) that defines the total amount of memory to be used by an application, such as a database. Note that although in the following description reference is made to a database application, depending on the embodiment, other applications may also be programmed in the manner described herein. Value 11 (also called "externally-set global value") may be provided, for example, by a database administrator (DBA) or may be automatically determined for example based on the memory currently available in the computer. Depending on the embodiment, externally-set global value 11 may be used by the application as a limit (that cannot be exceeded), or as a target (that may be reached from time to time, or may not be reached, e.g. underreached or overreached most of the time).

In one embodiment, database system 10 (FIG. 1A) computes (see logic 13) a value 14 (hereinafter "global internal value") that is internal to the database software, taking into account the amount 12 (FIG. 1A) of memory that is not available to the processes of the application, e.g. for executing queries. Specifically, logic 13 (FIG. 1A) takes into account memory (called "free memory") that is allocated but not used, and memory (called "other memory") that is unrelated to operators (such as sort, hash-join and bitmap merge) that implement a query.

Depending on the embodiment, database system 10 (FIG. 1A) uses global internal value 14 to compute (see logic 15) another internal value 17 (also called "memory bound") which is used in allocation of memory for each operator. Memory bound 17 is an operator-level value that defines the amount of memory that may be allocated by each process 18, for each operator's work area. Each process 18 compares memory bound 17 with an amount 20 of memory needed by an operator, to determine the amount 21 of memory to be allocated, and thereafter allocates an appropriate amount of memory. However, depending on the type of database (e.g. hierarchical) and/or the structures and processes that implement the database, a memory bound may be derived directly from the externally-set global value, i.e. without computing a global internal value 14 as described above. Moreover, in an alternative embodiment, an operator-level value 17 is not used and instead each process determines the amount of memory to be allocated to an operator based on global internal value 14, or even on externally-set global value 11 (depending on the implementation) while taking into account statistics on memory usage to implement a feedback loop.

In one such embodiment, database system 10 (FIG. 1A) implements a feedback loop as follows: if the externally-set global value is being exceeded by the total memory that is currently allocated by database system 10, the database system 10 reduces the memory bound (and vice versa), so that the total memory allocated by database system 10 approaches the externally-set global value 11, either as a target or as a limit, as discussed above. If memory bound is not used, such an embodiment may change global internal value 14 even if value 11 remains unchanged.

The above-described operations can be implemented in any manner that is apparent to the skilled artisan in view of the disclosure. For example, the feedback loop may be based on revising memory bound 17 (and/or global internal value 14) either periodically or asynchronously, or both. In one embodiment, database system 10 periodically (e.g. once every 3 seconds) revises memory bound 17 based on statistics related to memory usage. Database system 10 may also revise memory bound 17 asynchronously, when allocating memory, e.g. if the total memory allocated by the database system 10 exceeds the externally-set global value 11 by a predetermined amount (which may be, e.g. zero, or 10% of the value 11). Also, the amount 21 of memory that is allocated may be the required amount 20, or may be the memory bound 17 or some amount derived from one or both of these, e.g. a multiple of the memory bound, or a multiple of the estimated amount, if the operator is deemed to be at a higher priority than other operators. In the just-described example, instead of priority, each operator may be allocated a certain amount of "currency," and the memory bound 17 may be a price that is paid using the currency to "purchase" the memory. In such a case, the amount of "currency" allocated to each operator determines the amount of memory that the operator receives.

In one embodiment, database system 10 includes a sequence of instructions (hereinafter "memory broker") 22 that compute the above-described memory bound 17. Memory broker 22 may be implemented as a process that is separate and distinct from processes that implement database queries. In this case, a database query process 18 compares memory bound 17 to one or more estimates, and allocates the appropriate amount of memory. Transfer of information between memory broker 22 and database query process 18 can be implemented through messages, or through shared memory.

In an alternative embodiment, the memory broker sequence of instructions are not set up as a separate process, and instead each of the database query processes invokes these instructions with a function call. Therefore, a common function may be used to allocate memory for all operators (instead of a different function for "sort" and "hash" operators, as described below). When using such a common function, each process directly uses the externally-set global value (also described above) to derive the amount of to-be-allocated memory.

Features of certain embodiments are combined in another embodiment wherein a memory broker merely computes the global internal value 14 (described above), and each query process uses the global internal value 14 to derive the amount of memory to be allocated for an operator. Also, depending on the embodiment, a memory bound 17 may be used differently when allocating memory for each operator, e.g. a higher priority query may allocate memory up to twice or three times the memory bound whereas a normal priority query allocates memory up to memory bound. Therefore, the limit on an operator depends on the priority of the specific query that is about to execute the operator, in this example. In another example, memory bound acts as a "price" instead of a "limit". Also, instead of having a common memory bound 17 for all operators (e.g. for normal priority queries), several memory bounds may be used, one for each type of operator.

In one embodiment, work area memory required by an operator is estimated by each process when allocating memory, and several estimates are made in one implementation depending on the mode in which the operator will operate, e.g. (1) an optimal mode wherein there is no disk access, (2) one pass mode wherein there is disk access but only one pass is required through the data on disk, and (3) minimal mode wherein multiple passes over the data on disk are required. The time required by an operator to execute a query depends on the mode of execution, e.g. the least time is required in the optimal mode, the most time is required in the minimal mode, and the time required for one pass is between the maximum and minimum, as illustrated in FIG. 6. Note that for the same operator, such estimates may be different for different queries, depending on the size of the input data. Thereafter, in this implementation, each process allocates an amount of memory for the operator depending on these estimates and on the memory bound.

For example, a process that invokes the "sort" operator determines the amount of work area memory (also called "sort area") to be allocated as follows: optimal memory estimate if the optimal memory estimate is smaller than memory bound, one pass memory estimate if memory bound is between the optimal memory estimate and the one pass memory estimate, and minimal memory estimate if memory bound is smaller than the one pass memory estimate.

In this particular example, a process that invokes the "hash join" operator determines the amount of work area memory (also called "hash area") to be allocated as follows: optimal memory estimate if the optimal memory estimate is smaller than memory bound, memory bound if the memory bound is between the optimal memory estimate and minimal memory estimate, and minimal memory estimate if the memory bound is smaller than minimal memory estimate. This is because the hash join operator benefits from the extra memory, between one pass estimate and optimal estimate whereas sort operator does not benefit. In this example, if memory bound is less than minimal memory estimate, then all operators receive their respective minimal memory estimates in one embodiment, whereas in another embodiment such operators are queued (until memory bound increases beyond the minimal memory estimate).

Therefore, database system 10 allows DBAs to tune memory parameters that are difficult to manually tune when using prior art databases. Specifically, regulation of the amount of memory that is allocated should depend on the relative frequency of use of an operator, the memory requirements for each operator, and the set of operators which are simultaneously active in the system. These conditions could vary a lot during a day, especially for ad-hoc environments. The prior art parameters that are known to the applicants are not automatically adjusted, and so they do not compensate for low or high memory usage in the system. Also, the prior art parameters that are known to the applicants don't control the maximum amount of memory a query will use, which tends to exacerbate over-allocation of memory and often causes thrashing due to memory depletion. Finally, such prior art parameters often waste PGA memory because more memory is allocated than is needed to get acceptable performance. Such memory that is not used in the prior art is better put to use by other queries or even by other applications when using an externally-set global value 11 as described above.

A computer 100 (FIG. 1B) of one embodiment that implements the above-described operations executes a number of software programs, such as an operating system 101, business logic 102, networking application 103, and a database application 110. Computer 100 can be any computer, such as an IBM Personal Computer (PC), or a Sun workstation, such as Ultra Sparc II Computer 100 includes one or more central processing units (CPUs) to execute instructions, nonvolatile memory (such as disks) to hold data and instructions, and volatile memory (such as DRAM) to temporarily hold data and instructions during execution. Computer 100 also includes a bus that interconnects the CPU(s) and the memories. Computer 100 may include a display device (such as a cathode ray tube) for displaying information to a user, and one or more input devices (such as a keyboard and/or mouse) to receive commands from the user.

Use of such a computer 100 is inherently required in the following description, even if such use is not explicitly identified. Database application 110 executes queries of various types to store information into and to retrieve information from a database (which may be, for example, a relational database). Each query may be executed via one or more operators, such as sort, hash-join and bitmap merge, in the normal manner. During execution of each query, computer 100 allocates memory as described below. The allocation is based either directly or indirectly on externally-set global value 11 (represented by the value of a database parameter PGA_AGGREGATE_TARGET). In this particular embodiment, value 11 is used as a target for the total memory to be allocated for internal use by processes (sometimes called "server processes") that execute the database queries. In one embodiment, a user interface 111 (FIG. 1B) receives (see act 112) global value 11 from a database administrator and stores (see act 113) the value in shared memory. Each process allocates memory for its internal use based (at least in part) on the value 11 read from the shared memory.

One embodiment of database 110 includes a sequence of instructions (hereinafter "memory broker") 115 that derive (see act 116 in FIG. 1B) an internal value from global value 11 and optionally from statistics on current memory usage, and store (see act 117) the internal value for use by the server processes when allocating memory. Depending on the implementation, the internal value can be either global internal value 14 that applies to memory allocated by all processes 120A-120Z, or an operator-level memory bound 17 that only applies to the memory being allocated for an operator. Based on the memory usage statistics, memory broker 115 dynamically revises the internal value in response to memory allocations by the server processes 120A-120Z (wherein A≦I≦Z, Z being the current number of processes, thereby to form a feedback loop (illustrated by branch 118 in FIG. 1B).

Depending on the embodiment, a server process 120A uses (see act 121) either the externally-set global value 11 or one of internal values 14 and 17 to determine the memory to be allocated, and thereafter allocates the memory. Next, process 120A updates (see act 122) statistics on usage of memory (e.g. to indicate the amount of memory that was allocated), and proceeds to execute the query in the normal manner. On completion of query processing, process 120A deallocates (see act 123) the previously allocated memory and also updates (see act 124) the memory usage statistics.

As noted above, memory broker 115 uses memory usage statistics in act 116 to revise either or both of internal values 14 and 17, depending on the embodiment. For example, memory broker 115 may find that there are too many processes and that the total allocated memory may significantly exceed the externally-set global value 11, in which case memory broker 115 reduces either or both of internal values 14 and 17, so that lesser amount of memory (than the current amount) is allocated in the future by the processes. On the other hand if memory broker 115 finds that there are too few processes and the total allocated memory significantly falls short of the externally-set global value 11, memory broker 115 may increase either or both of internal values 14 and 17 so that greater amount of memory is allocated in future by the processes. In this embodiment, the externally-set global value 11 and the internal values 14 and 17 are treated as targets by the database application 110 which tries to meet the target(s), to within a certain range.

Memory broker 115 of this embodiment operates periodically (e.g. once every 3 seconds) to revise the internal target being used by processes 120A-120Z to allocate memory. However, a server process 120I may also invoke memory broker 115, e.g. if the total allocated memory exceeds the externally-set global value 11 by a predetermined amount. Specifically, in one embodiment, process 120A computes (see act 125 in FIG. 1A) a difference (hereinafter "drift") between the total memory allocated by all of processes 120A-120Z and the externally-set global value 11. In one specific implementation, the "drift" is a signed number indicating incremental allocation or deallocation of memory from the last computation of memory bound 17. This specific implementation sets drift to zero whenever memory bound 17 is recomputed. Thereafter, each process 120I that allocates memory for an operator increments drift by the amount of allocated memory (in a similar manner, when memory is released, drift is decremented by the amount of released memory).

After allocation, process 120A checks if the drift exceeds e.g. 10% of the externally-set global value 11 and if so invokes memory broker 115. When invoked, memory broker 115 revises either or both of internal values 14 and 17 in the above-discussed manner. Process 120A may also compute the drift (see act 126 in FIG. 1B) and alert memory broker 115 when deallocating memory.

Figure 2:
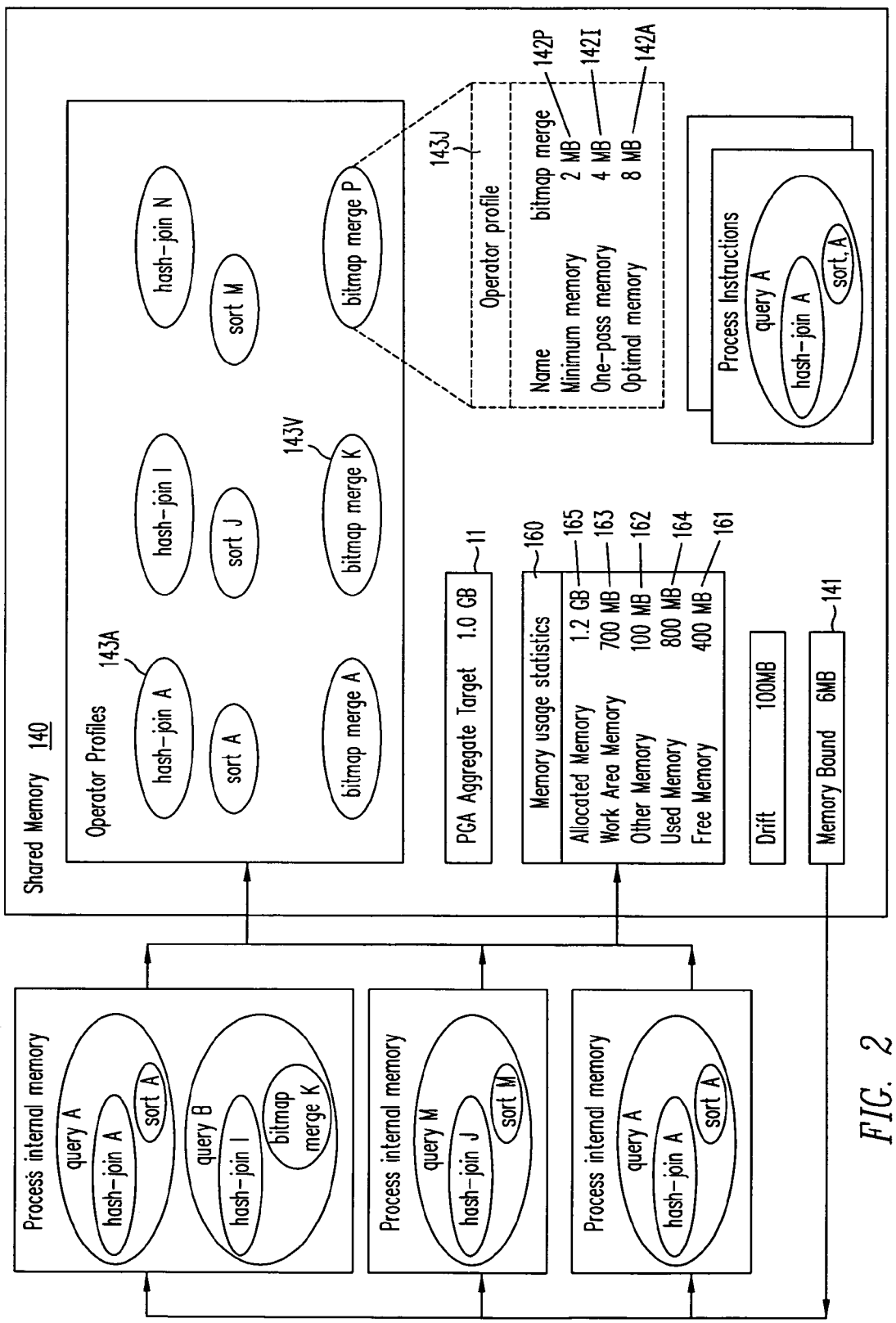
FIG. 2 illustrates, in a high level block diagram, use of shared memory by multiple server processes of the type illustrated in FIG. 1B.

Depending on the embodiment, memory broker 115 may use an internal value 14 that is global to compute another internal limit 17 that is applied at the operator level. Specifically, such an operator-level limit (called "memory bound") 141 (FIG. 2) is held in a shared memory 140, and identifies a limit on (or a target for) the memory to be allocated by a server process 12A, for each operator in each query. Therefore, server processes 120A-120Z compare memory bound 141 with an estimate 142I of needed memory (e.g. for the operator to operate in a one pass mode), to determine the memory to be allocated, and thereafter allocate an appropriate amount of memory (or get queued, depending on the implementation). Note that in this implementation, the same memory bound 141 is used to allocate memory to all operators, although in another implementation a different memory bound may be used for each type of operator (e.g. hash-join may have a bound that is different from a corresponding bound for sort).

Each of the estimates 142A-142P is held in a profile 143J of an operator for which memory is to be allocated. In one implementation, each of a number of profiles 143A-143V is held in shared memory 140. In this implementation, processes 120A-120Z register each operator (see act 127 in FIG. 1B), by creating in the shared memory 140, a corresponding profile 143J that contains three estimates of memory needed by the operator, to operate in each of: optimal mode, one pass mode, and minimal mode. The "optimal" mode is also referred to herein as "cache" mode because no disk access is required by an operator during execution.

Figure 3:
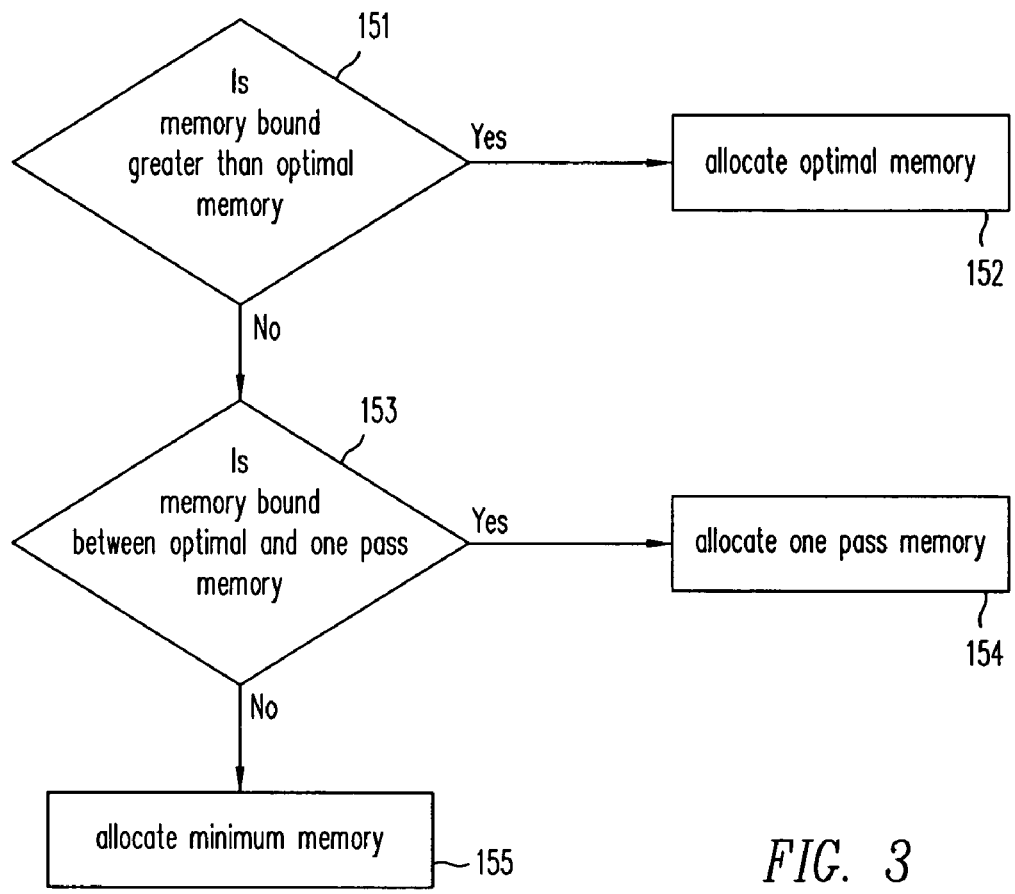
FIG. 3 illustrates, in a flow chart, acts performed in one embodiment of the comparison act performed by the server processes of FIG. 1B.

Thereafter, a process 120I determines the amount of memory to be allocated for a sort operator in a database application as follows: the optimal memory estimate 142P if the optimal memory estimate 142P is smaller than memory bound 141 (see acts 151-152 in FIG. 3), the one pass memory estimate 142I (FIG. 2) if the memory bound 141 is between the optimal memory estimate 142P and the one pass memory estimate 142I (see acts 153-154 in FIG. 3), and minimal memory estimate 142A (FIG. 2) if the memory bound 141 is smaller than the minimum memory estimate 142I (see act 155 in FIG. 3). The just-described allocation is used because the sort operator does not benefit as much from an increase in memory from one pass estimate to cache estimate (as compared to the increase in memory from minimal to one pass).

Figure 1B:
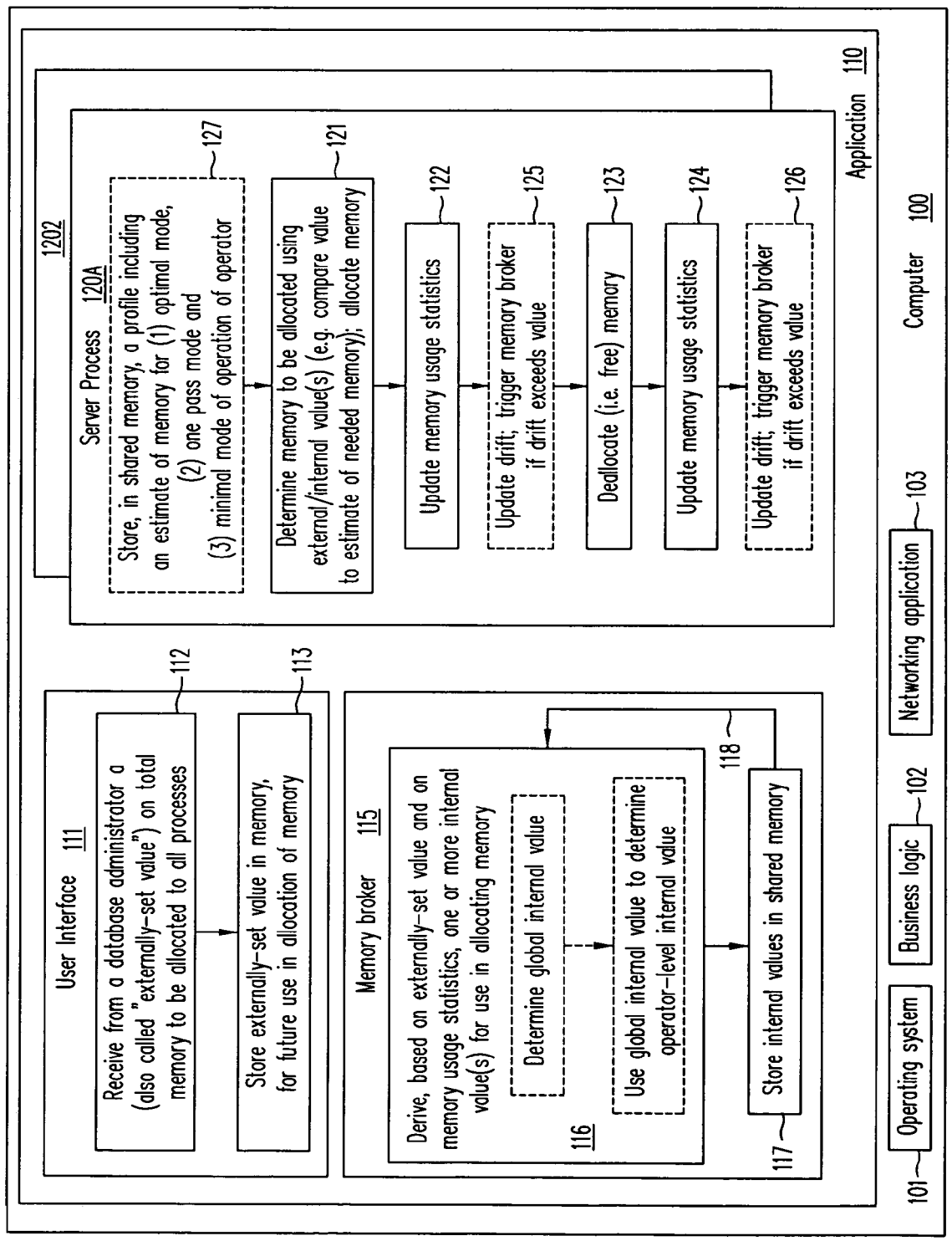
FIG. 1B illustrates acts performed by an application in a computer of the type illustrated in FIG. 1A.

As noted elsewhere, the specific method to determine the amount of to-be-allocated memory may depend on several factors: the process's attributes (e.g. priority) or the operator. Act 127 of FIG. 1B is optional, and it is not necessary to register into shared memory 140 the operator profiles, and instead such profiles are individually maintained by each process 120A in its own internal memory in other implementations.

Note that minimal memory estimate 142A may be greater than the memory bound 141 for some operators and in one embodiment, such processes are not queued but are allowed to allocate the minimal memory estimate 142A, so that the query is executed. In such a case, if other processes underallocate, i.e. allocate memory less than memory bound 141, then the total memory allocated by the application can remain below the externally-set global value 11. However, the processes 120A-120Z that allocate memory greater than memory bound 141 may outpace the processes that underallocate so that the total allocated memory may exceed the externally-set global value 11 and cause the global internal value 14 to be decreased (by memory broker 115) which in turn causes memory bound 141 to be decreased (also by memory broker 115). Thereafter, processes 120A-120Z are forced to allocate less memory than they would otherwise allocate if value 11 had remained unchanged. In this manner, there is some give and take among processes 120A-120Z, so that the externally-set global value 11 is reached. If the total number of processes 120A-120Z is excessive, e.g. if the sum of minimum memory estimates 142A-142Z for all processes exceeds the value 11 then additional memory is not allocated for any process, and instead memory requests are queued.

Figure 4:
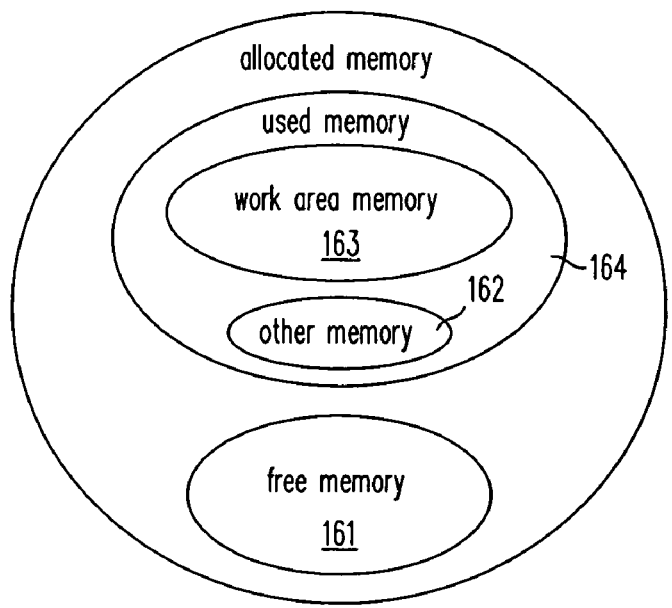
FIG. 4 illustrates, in a venn diagram, various components that together form the memory allocated to one or more server processes of FIG. 1B.

In one embodiment, processes 120A-120Z also update statistics 160 (FIG. 2) on memory usage whenever memory is allocated or deallocated as noted above in reference to FIG. 1A. Specifically, statistics 160 include the amount of memory (called "free memory") 161 (FIGS. 2 and 4) that is allocated but not used. For example, a process 120I may need to allocate 1 MB, but if operating system 101 provides memory only in 4 MB increments (e.g. due to this being the page size) then 3 MB is free memory, 4 MB is allocated memory, and 1 MB is used memory. Free memory 161 (FIG. 4) is not normally available to any other process 120J.

Processes 120A-120Z also update, in statistics 160, the amount of memory (called "other memory") 162 (FIGS. 2 and 4) that is unrelated to operators (such as sort, hash-join and bitmap merge) that implement a query. For example, process 120I may include PL/SQL or JAVA instruction sequences which are unrelated to the query-implementation operators, and for which memory 162 is used. Normally, other memory 162 cannot be changed by changing the way in which the operators function (e.g. one pass v/s multi pass).

Processes 120A-120Z also maintain, in statistics 160, the amount of memory (called "work area memory") 163 that is actually used by the operators. Maintenance of statistics 160 by processes 120A-120Z is implemented in one embodiment in wrapper functions that in turn call "malloc" and "free." Also, statistics 160 can be maintained separately for each of the individual processes 120A-120Z, or alternatively the sum totals of each statistic (across all processes 120A-120Z) may be maintained.

Figure 5:
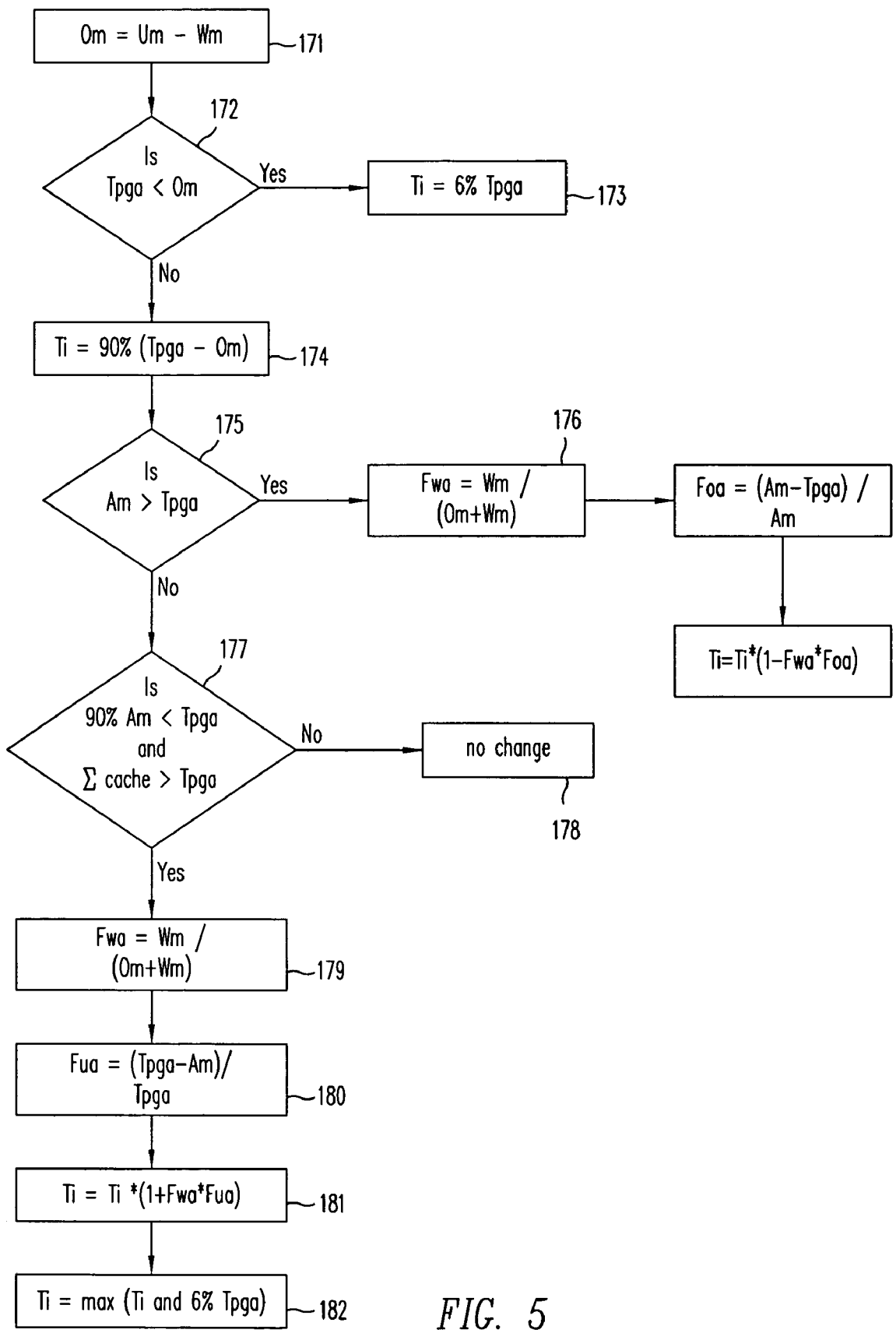
FIG. 5 illustrates, in a flow chart, acts performed by the memory broker of FIG. 1B, in one embodiment of the act of determining an internal target.

In one embodiment, memory broker 115 uses the above-described statistics 160 to compute global internal value 14 (denoted in FIG. 5 as Ti which is used as a target for the amount of work area memory 163 in the following manner. Specifically, memory broker 115 first computes other memory 162 (denoted as Om in FIG. 5) as the difference between used memory 164 (denoted as Um in FIG. 5) and work area memory 163 (denoted as Wm in FIG. 5). Next memory broker 115 checks (see act 172 in FIG. 5) if the externally-set global value 11 (also called "PGA AGGREGATE TARGET" and denoted as Tpga in FIG. 5) is less than other memory 162, and if so sets Ti to be 6% of Tpga.

Therefore, in the worst possible case, when other memory 162 memory is too high, a certain minimum (e.g. 6%) of Tpga is used as the global internal value 14. This is because the size of other memory 162 is beyond the control of memory broker 115. If other memory 162 is less than Tpga, then in act 174, memory broker 115 sets the global internal value 14 to 90% of the difference between Tpga and Om, and goes to act 175. This is done as a "safety" measure to account for a change in allocated memory during the time period between two successive operations of memory broker 115 (so in one example, allocated memory is not expected to grow faster than 10% in 3 seconds).

Next, in act 175, memory broker 115 checks if the allocated memory (denoted as Am in FIG. 5) is greater than Tpga, and if so goes to act 176 (to deal with overallocation) and alternatively goes to act 177 (to deal with underallocation). In act 176, memory broker 115 computes a factor Fwa (also called "work area allocation factor") as the ratio Wm/(Om+Wm), and further computes another factor Foa (also called "over allocation factor") as the ratio (Am−Tpga)/Am, and determines the new limit Ti to be the current limit Ti multiplied by (1−Fwa*Foa).

In act 177, memory broker 115 checks if 90% of Am is less than Tpga and also if sum of all optimal memory allocations is greater than Tpga, and if so there is no change in Ti. Alternatively, memory broker 115 goes to act 179 to compute the above-described work area allocation factor Fwa. Next, in act 180 memory broker 115 computes an under allocation factor Fua (also called "boosting factor"), as the ratio (Tpga−Am)/Tpga. Thereafter, memory broker 115 computes the new limit Ti to be the current limit Ti multiplied by (1+Fwa*Fua). Next, memory broker 115 sets (in act 182) either the newly computed limit Ti or 6% of Tpga whichever is greater, as the global internal value 14, which is used as described herein.

Specifically, in future, the newly computed global internal value 14 is used to allocate memory required by various operators. As described elsewhere herein, such a global internal value 14 may be used directly by the processes (that are allocating memory for each individual operator), or may be used to compute a memory bound 17 that in turn is used by such processes. In one specific embodiment, memory bound 17 is computed from global internal value 14 as described below in pseudo-code in the attached Appendix.

Automatic and dynamic allocation of memory as described herein can be used in combination with a manual mechanism of the prior art, e.g. by use of a database parameter that may be called "WORKAREA_SIZE_POLICY" that may be set to one of two values AUTO and MANUAL. Setting this parameter to AUTO invokes automatic and dynamic allocation. Also, another database parameter PGA_AGGREGATE_TARGET (described above) may be implemented, and when set by the database administrator, the default value of parameter WORKAREA_SIZE_POLICY is automatically set to AUTO.

Alternatively, the value of parameter WORKAREA_SIZE_POLICY is automatically set to MANUAL when PGA_AGGREGATE_TARGET is not set. If the parameter WORKAREA_SIZE_POLICY is set to MANUAL, then PGA_AGGREGATE_TARGET is not used in this embodiment, and instead the database uses a prior art mechanism (e.g. by use of individual targets set by the database administrator on memory for each operator).

Automatic and manual mechanisms may be combined, for example, to maintain backward compatibility: some operators may use the manual mechanism while others may use the automatic mechanism. In such a combined operation, global internal value 14 is automatically reduced, to accomodate the memory used by the manual mechanism.

Depending on memory usage, memory broker 115 may reduce memory bound 17 soon after an operator allocates memory, e.g. if there is a sudden increase in the number of running queries. Conversely, the memory broker 115 may increase the memory bound 17 if the demand for memory drops. After a new internal value for memory bound 17 has been computed, the value 17 is applied in one particular embodiment only to new operators that are about to allocate memory, after the computation. In an alternative embodiment, such a new value of memory bound 17 is also used by operators that have previously allocated memory and that are currently executing, thereby to reduce (or increase) their previously allocated memory during execution.

Responsiveness of the operators to a change in memory bound 17 can affect the number of times memory broker 115 recomputes memory bound 17 within a given interval, and/or the amount of change in memory bound 17. For example, if the operators that are currently executing are non-responsive or respond slowly (as compared to responsiveness of memory broker 115) then memory broker 115 repeatedly reduces the global internal value 14 and memory bound 17, so as to ensure that the total allocated memory approaches the target of externally-set global value 11.

To be responsive to changes in memory bound 17 after allocation of memory, operators (such as sort and hash join) may check for a change in memory bound 17 (or global internal value 14) at convenient points during their execution. The points at which a change in memory bound 17 (or global internal value 14) is checked can be set up either synchronously (e.g. once every second) or asynchronously (e.g. after one or more acts are performed during execution of an operator). In both embodiments, operators change their modes, e.g. from optimal to one pass, or from one pass to minimal and therefore their allocated memory, depending on decisions made by memory broker 115. Moreover, operators of such embodiments may revise their estimates of memory requirements dynamically, during their operation. Modifications to a hash-join operator and to a sort operator to implement a change of mode and change of allocated memory during execution are discussed briefly below and in greater detail in the related patent application, entitled "Adaptive Memory Allocation," application Ser. No. 09/969,334 that was incorporated by reference above.

In one embodiment, a hash-join operator of the AUTO version (described above) registers information about its work area (e.g. stores an estimate of memory required in each of the three modes: optimal mode, one pass mode and minimal mode). In this embodiment, a variable called "mode" (that resides in SGA) for each operator indicates the current mode of operation of an operator, and therefore its memory usage. In this embodiment, the "mode" variable for each operator is changed only by the operator in this embodiment (although in an alternative embodiment memory broker 115 may make such a change).

As long as the memory bound 17 is sufficiently high the hash-join operator operates in optimal and the hash-join operator allocates an initial amount of memory and dynamically increases its memory (up to the optimal mode estimate) to store input rows. However, even when operating in the optimal mode, the hash-join operator partitions the input data based on one-pass requirement, to allow switching to the one-pass mode if the memory bound 17 is reduced. In this embodiment, when building in memory, if the memory bound 17 is sufficiently reduced to cause a change of mode from optimal to one-pass, the hash-join operator resizes its work area to one-pass requirement by flushing an appropriate amount of data to disk.

During the one pass mode (in the build phase), the hash-join operator works in the normal manner. However, the work area is sized to contain one build partition plus one or more IO slots per additional partition (to support asynchronous input and output). During this phase, the work area is not resized even if the input is much larger than expected. The hash-join operator uses only the amount of memory estimated for the one-pass mode at the time the build was started.

Once the first one-pass build (which is the first build) is finished, the size of each partition of the build is known. If the actual size of the largest partition is two times (or more) bigger than a predicted common size for each partition (e.g. the one-pass size), the hash-join operator rebuilds, using rows from the first build. The rebuild act uses the exact size to determine the ideal number of build partitions, and therefore a more accurate estimate of the work area memory.

Building a second time is faster than the first build (in most cases) because the input data size during the rebuild is smaller than the original data size, the build time is generally very small compared to the probe time. Also, the extra rebuild time is negligible when compared to the overall execution time of the hash-join operator because the probe time is significantly larger. However, the memory saving from such a rebuild could be huge (if the error made to estimate the input size is important).

As long as the memory bound 17 is high to allow execution in "cache" (also called "optimal") mode, the hash-join will probe in memory. If the bound 17 is sufficiently reduced to cause a change of mode to "one-pass", the hash-join will switch to a one-pass probe by resizing its hash area. At that time, a subset of partitions are flushed to disk, and the probe proceeds in one pass mode with the partitions that are left in memory. Later on, in case memory bound 17 is revised lower than the one pass estimate, all build partitions that are currently remaining in memory are flushed to disk. Then the probe is partitioned based on the minimum requirement (e.g. 2 slots per partition).

For each pair of build/probe partition, the hash-join operator allocates enough memory to cache the smallest of the two partitions in memory. Because of the potential extra rebuild phase, the memory consumed should be close to the ideal one-pass memory requirement even if the input size estimate was incorrect.

The modifications made to the sort operator when it is running in "AUTO" version (described above) are similar to the ones made to the hash-join operator. The sort operator is able to switch from optimal mode to one-pass mode at any point in time. The sort operator also progressively increases the size of each sort run to account for bad estimates in the input size. That way, the sort operator always performs a one-pass merge with small increase of memory.

In one embodiment, when the work area estimated by the sort operator exceeds a predetermined value (such as 128 KB), the sort operator registers its work area profile (including the estimate). Estimates that are equal to and less than the predetermined value are not registered, so as to limit the impact of use of the memory broker 115 in online transaction processing (OLTP) environment, wherein inputs to the sort operator are most of the time very small as compared to other environments. Therefore, involvement of the memory broker 115 for tiny work areas may be avoided.

The optimal mode of the sort operator is similar to sort operator of the MANUAL (described above) version. Rows fetched from the underlying row source are added to the sort operator's work area. The size of the work area is increased in a lazy fashion. If at some point the memory requirement is higher than the optimal memory estimate (e.g. the input is bigger than predicted), one or more of the three estimates are updated. As long as the memory bound 17 is sufficiently high to allow allocation of optimal memory estimate for current execution the sort operator continues to extend its work area even if the requirement is bigger than an initial optimal memory estimate that was made when the sort was started.

If at some point memory bound 17 is sufficiently reduced to cause a change of mode from optimal to one-pass, the sort operator flushes the current and first sort run to disk. Then the sort operator shrinks the work area to the current one-pass memory estimate. At that point, the sort operator switches to one-pass mode.

In one-pass mode, the sort operator dynamically expands the work area to account for a bad estimate in the input size. For example, let's assume that the real input size is 800 MB instead of an expected size of 100 MB (8 times off). When the sort operator starts to produce its first set of sort runs, it sizes the work area based on the estimated 100 MB input size. This gives an initial work area size of 2.5 MB assuming 64 KB IO size. Once 100 MB of the input has been consumed, which corresponds to 40 runs, the sort operator notices that more rows need to be sorted. At that point, the sort operator postulates that the estimate input size is two times off and will assume a new estimate of 200 MB instead of 100 MB. Based on this new estimate, the work area is resized by multiplying its actual size by a factor of sqrt(2) because the memory required for one pass varies as the square root of the input size. The same technique is repeated again and again until all rows from the input are consumed.

In the example, there may be 40 runs of 2.5 MB each for the first 100 MB, then 29 runs of 3.5 MB each for the next 100 MB, then 40 runs of 5 MB each for the next 200 MB and finally 56 runs of 7 MB each for the last 400 MB. At the end of the first phase of the sort operator, there are a total of 165 runs, instead of an "ideal" number of 114 runs that would have been obtained if it was known from the beginning that the input size was 800 MB. These runs are merged in one-pass operation using a merge area of 10.3 MB (165×64 KB). This is slightly more memory than the 8 MB (128×64 KB) required for a one-pass merge of the ideal number of runs which is 128.

Generally, assuming that the estimated size Sestim of the input to the sort operator is off by at most a factor of $2^n$ compared to the real input size S (i.e. $2^{n-1}$ S<Sestim<=$2^n$S), one can demonstrate that the final number of sort runs Nfinal will be:

$$(((1 - 1/\sqrt[n]{2})(2 - \sqrt{2})) + 1/\sqrt[n]{2})N$$

where N is the ideal number of runs for the real size S (i.e. N=sqrt(S/C)). In the above example, we were 8 times off so n is 3. Using the above formula, a skilled artisan can compute that the sort operator will produce 1.45 times the number of runs of an ideal one pass. It means that the one-pass merge phase will consume 1.45 times the ideal one-pass memory. When n is 1 (2 times off), this factor is 1.2 and when n is infinite, this factor converges to 1/(2−sqrt(2)) which is 1.7. So in the worst case the extra memory consumption is limited during the merge phase to 1.7 times the ideal requirement (assuming known input size). Also, if the memory consumption during the entire sort operator is considered, it is slightly less because runs are produced using less memory than the ideal memory.

Without this technique, doing a one-pass merge would require $2^n$ more memory than the memory for one pass merge. In terms of memory consumption it is even worse than this because the duration of the merge pass is proportional to the number of runs. Without adapting the size of the work area dynamically, the sort operator will produce many runs (which are small) thus increasing the duration of the merge phase.

Numerous modifications and adaptations of the embodiments and implementations described herein will be apparent to the skilled artisan in view of the disclosure. For example, after completion of execution of a query, statistics specific to the query may be saved for use in making an estimate when that very same query needs to be executed again (e.g. by another process).

Also, if all active operators could run with their minimum memory and assuming that more memory is available, memory broker may allocate that memory first to operators which would benefit the most from a memory increase. For example, memory broker may be programmed to give more memory to a hash-join operator so that its response time is reduced from 5 minutes to 1 minute (5 times speed-up) versus giving the same amount of memory to another hash join operator so that its response time is reduced from 1 hour to 30 minutes (only two times speed-up). Therefore, one embodiment considers the response time speed-up and not really the absolute improved time. Moreover, a memory bound can also be used as described herein, in databases that allocate all of the memory required by operators in shared memory (instead of private memory).

Therefore, numerous such modifications and adaptations of the embodiments and implementations described herein are encompassed by the attached claims.

Some embodiments use a computer-readable medium having stored therein a plurality of sequences of instructions, the plurality of sequences of instructions including sequences of instructions which, when executed by a computer, cause the computer to perform a method of the type described herein. Several embodiments use a signal embodied in a carrier medium and encoded with a plurality of sequences of instructions, the plurality of sequences of instructions including sequences of instructions which, when executed by a computer, cause the computer to perform a method of the type described herein.

APPENDIX

Initialization workarea_left := work areas of all operations active in the system
number_of_workarea_left := number of work areas active in the system
memory_target := the global internet target or limit to distribute among
           the active work areas Memory Bound Computation

```
/* This while loop terminates once all work areas are removed from
** the set of active work areas or all the memory has been consumed.
*/
WHILE (memory_target > 0 and number_of_workarea_left > 0)
{
    /* compute an initial value of the memory bound assuming that each work
    ** area will comsume bound. Some of them might consume less than this so
    ** the final memory_bound might be higher than this initial value.
    */
    memory_bound = memory_target / number_of_workarea_left;
    /* Loop over all operations left in workarea_left, i.e., that have not
    ** been assigned a memory size to use during their execution.
    */
    removed = FALSE;              /* no one has been removed so far */
    FOR EACH (workarea(WA) in workarea_left) DO
        {
            /* Compute the size of the memory it can use based on the memory_bound.
            ** Also compute the memory increment it will take in case we are willing
            ** to give it more memory.
            ** This memory incerment is operation-dependent.
            ** Hash-Join, the next memory increment can be anything, while for Sort,
            ** it will be the memory requirement of a higher mode. That's if current
            ** memory usage corresponds to one pass the next memory increment is the
            ** memory necessary to move to optimal mode requirement.
            ** The reason is that the Hash-Join operation performance will improve
            ** linearly from additional memory while the Sort doesn't.
            */
            get_memory_profile(IN:WA, IN:memory_bound,
                        OUT:memory_used, OUT:next_increment);
            /* Memory used is equal to the memory requirement to run in optimal mode
            ** which means that the memory_bound is greater than that requirement.
            ** This operation has the maximum memory size it can hope for, so we'll
            ** take it off the list of left work areas.
            */
            IF (memory_used == optimal memory)
            {
                memory_target -= memory_used;         /* this much is consumed */
                workarea_left -= {WA};                /* remove it from the set */
                number_of_workarea_left--;                    /* one less */
                removed = TRUE;
            }
            ELSE
            {
                /* We keep this work area for now, and check whether it's the largest
                ** one in the set, in which case we keep a tag on it.
                ** Such a work area is the best candidate to eliminate relative to the
                ** ones left
```

-continued

APPENDIX

```
            ** Once this loop is over we will eliminate it from the set.
            */
            /* In case we didn't remove any work area during the previous loop */
      }
      IF ((NOT removed) AND max_next_memory < memory_used + next_increment)
      {
            max_next_memory = memory_used + next_increment;
            largest_wa = WA;
            memory_of_largest_wa = memory_used;
      }
   }
}                        /* end of FOR EACH LOOP */
/* All work areas have got their best hope for memory size, then we are
** done.
*/
IF (the memory used by each WA is equal to the bound)
{
      number_of_workarea_left = 0;
}
ELSE
      /* We couldn't remove one work are */
      IF (removed ==– FALSE)
      {
            /* remove the largest a work area, take off the largest one */
            workarea_left –= {largest_wa};
            memory_target –= memory_of_largest_wa;
            number_of_workarea_left--;
      }
}
```

The invention claimed is:

1. A method of allocating memory to a plurality of processes related to a database in a computer, the method comprising:

storing a first value of an amount of total memory to be allocated to the processes; and deriving, based on the first value, a second value of an amount of memory to be allocated by at least one operator that implements a query on the database in at least one of the processes, wherein a profile of said operator is used to derive the second value for said operator; and allocating memory in the amount of second value.

2. The method of claim 1 wherein:

all of the processes have access to a shared memory in the computer; and the method includes storing the second value in the shared memory.

3. The method of claim 2 further comprising:

each process allocating memory based on the second value; and each process storing in the shared memory the amount of memory allocated to the process.

4. The method of claim 1 wherein:

the computer includes additional processes unconstrained by the values.

5. The method of claim 1 wherein:

the second value is common to all of the operators in all of the processes.

6. The method of claim 1 further comprising:

periodically repeating the act of deriving.

7. The method of claim 1 further comprising:

repeating the act of deriving, at least when the total memory allocated to the plurality of processes exceeds the first value by a predetermined amount.

8. The method of claim 1 wherein:

during said deriving, the second value is set to one of (a) an operator-level internal value that is a common limit across all operators in all processes of the database, (b) an estimate of memory needed by said operator, and (c) an amount derived from at least either or both (a) and (b).

9. The method of claim 1 wherein:

the profile comprises a plurality of estimates needed by said operator; and at least one of said estimates is used during said deriving.

10. A method of allocating memory to a plurality of processes related to a database in a computer, the method comprising:

storing a first value of an amount of total memory to be allocated to the processes;

deriving, based on the first value, a second value of an amount of memory to be allocated by at least one operator in at least one of the processes;

wherein all of the processes have access to a shared memory in the computer; and each process storing in the shared memory, the amount of memory used by each operator in the process, the amount of memory used by other portions of the process, and the amount of memory allocated but not used by the process.

11. A method of allocating memory to a plurality of processes in a computer, the method comprising:

storing a first value of an amount of total memory to be allocated to the processes;

deriving, based on the first value, a second value of an amount of memory to be allocated by at least one of the processes;

allocating memory in the amount of second value;

changing the first value based at least on comparison of an externally-set global value and total memory currently allocated to the processes; and repeating the act of deriving after changing the first value.

12. The method of claim 11 wherein:

the plurality of processes are related to a database; and the second value of an amount of memory is to be allocated by at least one operator in at least one of the processes; and said at least one operator implements a query on the database.

13. The method of claim 12 wherein all of the processes have access to a shared memory in the computer, the method further comprising:

each process storing in the shared memory a plurality of estimates of memory needed for a corresponding plurality of modes of execution of said at least one operator.

14. The method of claim 12 wherein all of the processes have access to a shared memory in the computer, the method further comprising:

each process storing in the shared memory the amount of memory used by each operator in the process, the amount of memory used by other portions of the process, and the amount of memory allocated but not used by the process.

15. The method of claim 11 wherein:

said repeating of the act of deriving is for said at least one process.

16. The method of claim 11 wherein:

said repeating of the act of deriving is for another process.

17. A computer-readable medium having stored therein a plurality of sequences of instructions, the plurality of sequences of instructions including sequences of instructions which, when executed by a computer, cause the computer to perform the method of claim 11.

18. A method of allocating memory to a plurality of processes in a computer, the method comprising:

storing a first value of an amount of total memory to be allocated to the processes;

deriving, based on the first value, a second value of an amount of memory to be allocated by at least one of the processes;

allocating memory in the amount of second value; and repeating the act of deriving without changing the first value.

19. The method of claim 18 wherein:

the plurality of processes are related to a database;

the second value of an amount of memory is to be allocated by at least one operator in at least one of the processes; and said at least one operator implements a query on the database.

20. The method of claim 19 wherein all of the processes have access to a shared memory in the computer, the method further comprising:

each process storing in the shared memory a plurality of estimates of memory needed for a corresponding plurality of modes of execution of said at least one operator.

21. The method of claim 20 further comprising:

comparing an operator-level internal value derived from the first value with at least one of the estimates;

wherein the outcome of the comparing is used in said deriving.

22. The method of claim 19 wherein all of the processes have access to a shared memory in the computer, the method further comprising:

each process storing in the shared memory the amount of memory used by each operator in the process, the amount of memory used by other portions of the process, and the amount of memory allocated but not used by the process.

23. The method of claim 18 further comprising:

repeating the act of deriving, at least when the total memory allocated to the plurality of processes exceeds the first value by a predetermined amount.

24. The method of claim 18 wherein the act of repeating is triggered by a change in the number of processes.

25. A computer-readable medium having stored therein a plurality of sequences of instructions, the plurality of sequences of instructions including sequences of instructions which, when executed by a computer, cause the computer to perform the method of claim 18.

26. A method of allocating memory to a plurality of processes related to a database in a computer, the method comprising:

storing a first value of an amount of total memory to be allocated to the processes;

deriving, based on the first value, a second value of an amount of memory to be allocated by at least one operator in at least one of the processes;

wherein all of the processes have access to a shared memory in the computer; and the method further comprises storing in the shared memory an estimate of memory to be used by the one operator.

27. The method of claim 26 wherein:

the estimate is of memory required by the one operator.

28. A method of allocating memory to a plurality of processes related to a database in a computer, the method comprising:

storing a first value of an amount of total memory to be allocated to the processes;

deriving, based on the first value, a second value of an amount of memory to be allocated by at least one operator in at least one of the processes;

wherein the method further comprises prior to said deriving, at least one process storing for said at least one operator a plurality of estimates for a corresponding plurality of modes in which said at least one operator can be executed by said at least one process; and wherein the plurality of estimates are used during said deriving.

29. The method of claim 28 further comprising:

comparing an operator-level internal value derived from the first value with at least one of the estimates;

wherein the outcome of the comparing is used in said deriving.

30. The method of claim 28 wherein the plurality of estimates comprises:

a first estimate of memory needed for optimal mode;

a second estimate of memory needed for one pass mode; and a third estimate of memory needed for minimal mode.

31. A computer-readable medium having stored therein a plurality of sequences of instructions, the plurality of sequences of instructions including sequences of instructions which, when executed by a computer, cause the computer to perform the method of claim 1.

32. A method of allocating memory to a plurality of processes related to a database in a computer, the method comprising:

comparing a predetermined value of memory to be allocated to an operator with at least one of three estimates: a first estimate of memory needed for optimal execution of the operator, a second estimate of memory needed for one pass execution of the operator, and a third estimate of memory needed for minimal execution of the operator; and deriving an amount of memory to be allocated to the operator based on outcome of comparison.

33. The method of claim 32 wherein:
the amount is determined to be the first estimate if the first estimate is smaller than the predetermined value.

34. The method of claim 32 wherein:
the amount is derived from at least the second estimate if the predetermined value is between the first estimate and the second estimate.

35. The method of claim 34 wherein:
the amount is also derived from a priority of the process relative to other processes.

36. The method of claim 32 wherein:
the amount is derived from at least the predetermined value if the predetermined value is between the first estimate and the third estimate.

37. The method of claim 32 wherein:
the amount is derived from the third estimate if the predetermined value is smaller than the third estimate.

38. The method of claim 32 further comprising, prior to the act of comparing:
determining the predetermined value based on total memory to be allocated to the processes.

39. The method of claim 32 further comprising, prior to the act of comparing:
storing the three estimates in a memory shared by the plurality of processes;
wherein the operator implements a query on the database.

40. The method of claim 32 wherein all of the processes have access to a shared memory in the computer, the method further comprising:
each process storing in the shared memory the amount of memory used by each operator in the process, the amount of memory used by other portions of the process, and the amount of memory allocated but not used by the process.

41. A method of allocating memory to a plurality of processes in a computer, the method comprising:
each process storing in a shared memory of the computer, an estimate of an amount of memory needed by the process;
each process comparing the estimate with a value retrieved from the shared memory; and
each process allocating memory based on outcome of the comparing;
wherein said value is automatically computed based on memory usage statistics.

42. The method of claim 41 wherein:
each process is related to a database; and
the estimate and the value are for an operator that implements a database query.

43. The method of claim 41 wherein the estimate is of memory needed for a minimal mode of an operator, the operator implementing a query on a database to which the plurality of processes are related, and further wherein:
the allocating is performed even when the estimate exceeds the predetermined number.

44. A method of allocating memory to a plurality of processes in a computer, the method comprising:
each process storing an estimate of an amount of memory needed by the process;
each process comparing the estimate with a value retrieved from a shared memory in the computer;
each process allocating memory based on outcome of the comparing;
wherein each process stores a plurality of estimates for a corresponding plurality of modes of execution of the operator; and
wherein memory allocated in the act of allocating is determined to be a first estimate if the first estimate is smaller than the value.

45. The method of claim 44 wherein:
the operator is sort; and
memory allocated in the act of allocating is determined to be a middle estimate if the value is between the first estimate and the middle estimate, wherein the middle estimate is between the first estimate and the second estimate.

46. The method of claim 44 wherein:
the operator is hash-join; and
memory allocated in the act of allocating is determined to be the value, if the value is between the first estimate and a middle estimate, wherein the middle estimate is between the first estimate and the second estimate.

47. A method of allocating memory to a plurality of processes in a computer, the method comprising:
each process comparing with a predetermined number, an estimate of memory needed by an operator that implements a database query; and
each process allocating memory based on outcome of comparison;
wherein said operator of a first process in said plurality of processes is different from said operator of a second process in said plurality of processes.

48. The method of claim 47 further comprising, prior to the act of comparing:
storing the estimate in a memory shared by the plurality of processes.

49. A method of allocating memory to a plurality of processes in a computer, the method comprising:
each process comparing with a predetermined number, an estimate of memory needed by an operator that implements a database query; and
each process allocating memory based on outcome of comparison;
wherein the predetermined number indicates memory available for allocation, the method further comprising:
performing the allocating when the predetermined number exceeds the estimate; and
queuing a process if the estimate exceeds the predetermined number.

50. The method of claim 47 wherein the estimate is of memory needed for minimal mode of the operator, and further wherein:
the allocating is performed even when the estimate exceeds the predetermined number.

51. A method of allocating memory to a plurality of processes in a computer, the method comprising:
storing a first value related to total memory to be allocated to the processes;
deriving a second value from the first value;
using the second value to allocate memory for a process; and
revising the second value after said using.

52. The method of claim 51 wherein said revising provides a revised second value, and the method further comprising:
using the revised second value to allocate memory for another process.

53. The method of claim 52 wherein:
said revised second value is derived from each of said second value and said first value.

54. The method of claim 51 wherein:
said revising is performed periodically.

55. The method of claim 51 further comprising:
each process updating a statistic on memory usage on allocation and deallocation of memory; and
comparing the statistic with at least one of the first value and the second value;
wherein the revising is based on an outcome of the comparing.

56. The method of claim 55 wherein:
each process performs the comparing and triggers the revising in response to the outcome.

57. The method of claim 51 wherein the plurality of processes are related to a database, and the second value takes into account:
memory that is allocated but not used; and
memory that is unrelated to operators that implement a query on the database.

58. The method of claim 57 further comprising, during said using:
computing an operator-level value that defines the amount of memory to be allocated by each process for each operator's work area.

59. The method of claim 51 further comprising:
checking if total memory allocated to all processes is greater than the first value.

60. The method of claim 51 further comprising:
computing work area allocation factor as the ratio of work area memory to the sum of work area memory and other memory, the other memory being the difference between used memory and work area memory.

61. The method of claim 60 further comprising, during said revising:
using the work area allocation factor.

62. The method of claim 51 wherein:
said revising is based on memory usage statistics.

63. The method of claim 51 wherein:
said revising decreases the second value if allocated memory is greater than first value.

64. The method of claim 51 wherein:
second value is a global internal value.

65. The method of claim 51 wherein:
second value is an operator-level internal value.

66. A computer-readable medium having stored therein a plurality of sequences of instructions, the plurality of sequences of instructions including sequences of instructions which, when executed by a computer, cause the computer to perform the method of claim 51.

67. The method of claim 51 wherein:
all processes in the plurality are related to an application in the computer.

68. A computer executing a plurality of processes related to a database, the computer comprising:
means for storing a first value of an amount of total memory to be allocated to the processes;
means for deriving, based on the first value, a second value of an amount of memory to be allocated by at least one database operator that implements a query on the database in at least one of the processes, wherein a profile of said operator is used to derive the second value for said operator; and
means for allocating memory in the amount of second value.

69. The computer of claim 68 further comprising:
means for changing the first value based on the second value.

70. A computer executing a plurality of processes related to a database, the computer comprising:
means for comparing a predetermined value of memory to be allocated to a database operator with at least one of three estimates: a first estimate of memory needed for optimal execution of the database operator, a second estimate of memory needed for one pass execution of the database operator, and a third estimate of memory needed for minimal execution of the database operator; and
means for deriving an amount of memory to be allocated to the database operator, coupled to the means for comparing to receive therefrom an outcome of comparison.

71. The computer of claim 70 further comprising:
memory storing the three estimates; and
wherein said means for deriving includes means for selecting a first estimate if the first estimate is smaller than the value.

72. A computer allocating memory to a plurality of processes executing therein, the computer comprising:
means for storing a first value related to total memory to be allocated to the processes;
means for deriving a second value from the first value;
means for using the second value to allocate memory for a process;
means for revising the second value after said using; and
means for using the revised second value to allocate memory for another process.

73. The computer of claim 72 further comprising:
means for updating a statistic on memory usage on allocation and deallocation of memory; and
means for comparing the statistic with at least one of the first value and the second value.

74. A computer-readable medium having stored therein a plurality of sequences of instructions, the plurality of sequences of instructions including sequences of instructions which, when executed by a computer, cause the computer to perform the method of claim 32.

75. A method of allocating memory to a plurality of processes in a computer, the method comprising:
each process storing in a shared memory of the computer, an estimate of an amount of memory needed by the process;
each process comparing the estimate with a value retrieved from the shared memory;
each process allocating memory based on outcome of the comparing; and
each process storing in the shared memory the amount of memory used by each operator in the process, the amount of memory used by other portions of the process, and the amount of memory allocated but not used by the process.

76. A computer-readable medium having stored therein a plurality of sequences of instructions, the plurality of sequences of instructions including sequences of instructions which, when executed by a computer, cause the computer to perform the method of claim 41.

77. A method of allocating memory to a plurality of processes in a computer, the method comprising:
each process comparing with a predetermined number, an estimate of memory needed by an operator that implements a database query; and
each process allocating memory based on outcome of comparison;
wherein all of the processes have access to a shared memory in the computer, the method further comprising:

each process storing in the shared memory the amount of memory used by each operator in the process, the amount of memory used by other portions of the process, and the amount of memory allocated but not used by the process.

78. A computer-readable medium having stored therein a plurality of sequences of instructions, the plurality of sequences of instructions including sequences of instructions which, when executed by a computer, cause the computer to perform the method of claim 41.

79. A method of allocating memory to a plurality of processes in a computer, the method comprising:
   storing a first value related to total memory to be allocated to the processes;
   deriving a second value from the first value;
   using the second value to allocate memory for a process; and
   in response to said using, repeating said deriving to obtain a revised second value.

80. The method of claim 79 further comprising:
   using the revised second value to allocate memory for another process.

81. The method of claim 80 wherein:
   each of the second value and the revised second value is an operator-level internal value.

82. The method of claim 80 wherein: each of the second value and the revised second value is a global internal value.

83. A method of allocating memory to a plurality of processes related to a database in a computer, the method comprising:
   storing a value of an amount of total memory that should not be exceeded by total memory allocated on behalf of a number of operators in the plurality of processes; and
   deriving, a bound on an amount of memory to be allocated by at least one operator that implements a query on the database in at least one of the processes, said deriving being performed based on said value and a profile, said profile comprising a plurality of estimates of memory needed for a corresponding plurality of modes of execution of said at least one operator; and
   allocating memory on behalf of said at least one operator in an amount based on the profile and the bound.

84. A computer-readable medium having stored therein a plurality of sequences of instructions, the plurality of sequences of instructions including sequences of instructions which, when executed by a computer, cause the computer to perform the method of claim 83.

85. A method of allocating memory to a set of processes in a computer, the method comprising:
   storing a global internal value of an amount of total memory that should not be exceeded by total memory allocated by the set of processes;
   deriving, based on the global internal value, a bound on an amount of memory that should not be exceeded by memory allocated by at least one of the processes;
   allocating memory in an amount of a second value, the second value being identified based on said bound and a profile of an operator to be executed by said at least one of the processes, said profile comprising a plurality of estimates of memory needed for a corresponding plurality of modes of execution of said operator;
   calculating the global internal value based at least on comparison of total memory currently allocated to the set of processes and an externally-set global value; and
   repeating, after calculating the global internal value, each of deriving, allocating, and calculating.

86. The method of claim 85 wherein:
   the set of processes are current processes executing queries on a database.

87. The method of claim 85 wherein:
   during said changing, the global internal value is increased if the amount of total memory currently allocated is less than the externally-set global value.

88. The method of claim 85 wherein:
   during said changing, the global internal value is decreased if the amount of total memory currently allocated exceeds the externally-set global value by a predetermined amount.

89. The method of claim 85 further comprising:
   computing an initial value for the bound assuming each operator consumes memory equal to the bound; and
   revising the initial value based at least partially on operators that have not been assigned a memory size.

90. A computer-readable medium having stored therein a plurality of sequences of instructions, the plurality of sequences of instructions including sequences of instructions which, when executed by a computer, cause the computer to perform the method of claim 85.

91. A method of allocating memory to a plurality of processes in a computer, the method comprising:
   storing a first value of an amount of total memory that should not be exceeded by the processes;
   deriving, based on the first value, a bound on an amount of memory to be allocated by at least one of the processes;
   allocating memory based on an estimate selected from among a plurality of estimates of memory needed for a corresponding plurality of modes of execution of said operator, the selected estimate being identified by comparison of at least one estimate with the bound; and
   repeating the act of deriving without changing the first value.

92. A method of allocating memory to a plurality of processes in a computer, the method comprising:
   each process storing a plurality of estimates of an amount of memory needed by the process for executing an operator in a corresponding plurality of modes;
   deriving, based on a global internal value, a plurality of bounds on amount of memory to be allocated by operators of a corresponding plurality of types;
   each process comparing the plurality of estimates with a bound that is specific to the type of operator to be executed by the process; and
   each process allocating memory in an amount of one of the estimates selected based on the comparing.

93. The method of claim 92 wherein each of said deriving, said comparing and said allocating are performed at a first time, and repeated at least one time thereafter.

* * * * *

UNITED STATES PATENT AND TRADEMARK OFFICE
CERTIFICATE OF CORRECTION

PATENT NO. : 7,409,517 B2  Page 1 of 1
APPLICATION NO. : 09/969290
DATED : August 5, 2008
INVENTOR(S) : Dageville et al.

It is certified that error appears in the above-identified patent and that said Letters Patent is hereby corrected as shown below:

In column 3, line 23, delete "15 )" and insert -- 15) --, therefor.

In column 9, line 58, delete "accomodate" and insert -- accommodate --, therefor.

In column 13-14, in Appendix, line 1, delete "Initilization" and insert -- Initialization --, therefor.

In column 13-14, in Appendix, line 13, delete "comsume" and insert -- consume --, therefor.

In column 13-14, in Appendix, line 26, delete "incerment" and insert -- increment --, therefor.

Signed and Sealed this

Twenty-third Day of March, 2010

David J. Kappos
*Director of the United States Patent and Trademark Office*